United States Patent

[11] 3,613,089

[72] Inventor Stephen S. Karp
Gaithersburg, Md.

[21] Appl. No. 871,841
[22] Filed Oct. 28, 1969
[45] Patented Oct. 12, 1971
[73] Assignee Bell Telephone Laboratories, Incorporated
Murray Hill, Berkeley Heights, N.J.

[54] ASSOCIATIVE MEMORY CONTROL FOR A SWITCHING NETWORK
5 Claims, 8 Drawing Figs.

[52] U.S. Cl. .......... 340/172.5, 179/18
[51] Int. Cl. .......... G06f 7/00, H04m 7/00
[50] Field of Search .......... 179/18; 235/157; 340/172.5

[56] References Cited

UNITED STATES PATENTS

| | | | |
|---|---|---|---|
| 3,129,407 | 4/1964 | Paull | 340/172.5 X |
| 3,229,260 | 1/1966 | Falkoff | 340/172.5 |
| 3,257,513 | 6/1966 | Feiner | 179/18 |
| 3,462,743 | 8/1969 | Milewski | 340/172.5 |
| 3,495,220 | 2/1970 | Lawson et al. | 340/172.5 |

*Primary Examiner*—Gareth D. Shaw
*Assistant Examiner*—Sydney R. Chirlin
*Attorneys*—R. J. Guenther and James Warren Falk

ABSTRACT: A communication system is disclosed in which paths through a multistage switching network are located by reference to information stored in associative memory. Specific methods control the acquisition of the stored information for establishment and termination of the network paths.

INVENTOR
S. S. KARP
BY Jas W Falk
ATTORNEY

CONCENTRATOR GRID

ASSOCIATIVE MEMORY CONTROL FOR A SWITCHING NETWORK

BACKGROUND OF THE INVENTION

Large-scale communication systems rely upon multistage switching networks to provide rapid and economical interconnection of stations. A full access network, which provides a separate link between each pair of network terminals, assures a nonblocking network, but the resulting inefficiency and attendant cost renders it impractical. For example, a 50,000 terminal network accommodating a maximum of 25,000 simultaneous connections would require $1.25 \times 10^{9}$ links with a link usage efficiency of 0.002 percent. By sharing links among several terminals and by offering each terminal the choice of a number of paths through the network, efficiency and economy may be improved at the price of some network blocking. Increasing the number of stages of switching also influences the network capability.

An optimum, multistage, switching network is complex and requires an efficient arrangement for determining and recording each network path between calling and called stations. In order to make the network switching elements as simple, reliable and inexpensive as possible, prior art arrangements limit the network to the switching function alone. Thus storage of the instantaneous network status, as well as the functions of path hunting, and connection and release of network paths are divorced from the network itself and are performed entirely by network control facilities. For these purposes, coordinate addressed memory maps are employed in the prior art.

The information recorded in these memory maps is among the most vital information recorded in the entire system, its loss being equivalent to the loss of power in an electromechanical switching network. Thus reliability is paramount and is achieved primarily through redundancy. The network control also strives for low processing time in establishing or releasing network connections. However, the nature of a coordinate access memory necessarily prolongs the path hunting process, particularly for a multistage network in which a number of sequential tests to locate idle paths in some stages may prove to be in vain if the extensions of these idle paths through other stages are blocked. This, of course, can be offset to some extent by parallel search operations, but efficiency and economy eventually must suffer.

SUMMARY OF THE INVENTION

The path hunting function of a multistage switching network is performed more rapidly and efficiently than the prior art and at comparable cost by utilizing one or more associative memories for the map, while utilizing conventional memories for the other memory functions, including storage of processor programs. Contrary to a coordinate addressed memory, a word in an associative memory is addressed by its content rather than its location in the memory. Thus the entire memory is searched in response to a single request, and all of the words which satisfy the request criteria are retrieved simultaneously.

In accordance with an aspect of my invention, associative memory tables are utilized for each input and output subnetwork. Three tables, in one specific embodiment, are used. A first table is primarily a junctor table in which is stored junctor identities and the busy/idle states of the junctors, the busy/idle states of C-link words for those junctors, and terminal number identities used in a path with the junctors. The second table is primarily a terminal and link table, storing the busy/idle status of the terminals, and words indicating the busy/idle status of the A and B links and a combined A–B link word list associated with these terminals. The third table simply indicates the available junctors or groups of junctors between pairs of input and output terminals. The information in this third table is all fixed and is not varied during a call.

The novel method in accordance with my invention involves associatively searching through the first and second tables. Thus, as an example, based on an identification of the line switch frame number of the input terminal, from the second table, all of the idle C-links associated with idle junctors can be simultaneously obtained from the first table. Accordingly, there is an interplay between the information in the two tables, with the information from one being used to obtain associatively information from the other.

The method of my invention involves obtaining the list of all possible junctors, based upon the selected input and output subnetworks, and then reducing that list by successively ascertaining the availability of idle links for a path between a selected subnetwork terminal and a junctor. As the unavailability of a path is determined, the junctor identity is removed from the list. At the end of this process, the junctors available to one subnetwork terminal, such as the input subnetwork, are known. The process is then or simultaneously repeated for the other subnetwork, here the output subnetwork, using the associate memory tables for that subnetwork. Again a list of the available junctors for which idle paths can be established to the subnetwork terminal is determined by this winnowing process of eliminating junctors as various links are found busy.

The two lists for the junctors found for the two subnetworks are then matched, and each junctor present on both lists indicates an available and idle path through the complete network. These tables also completely identify the path; no additional information is necessary, a further improvement on the prior art. The processor then instructs the network controller to establish the identified path.

In accordance with an aspect of my invention the junctor link identities are used for the list because, structurally, the junctors exist at the narrowest point of the network. Thus the initial list of available components is shortest by using the junctor link identities and removing from that list those junctors proven by the subsequent steps of my method not to be available for the desired path.

It is a feature of my invention that a path be selected through a multistage switching network having subnetworks, junctors, and links by associatively searching through two tables in an associate memory or memories, the one table indicating the busy/idle status of junctors and the other table busy/idle status of subnetwork terminals, and each being searched by a request from the other table for information as to the busy/idle status of various of the links.

Figure 1:
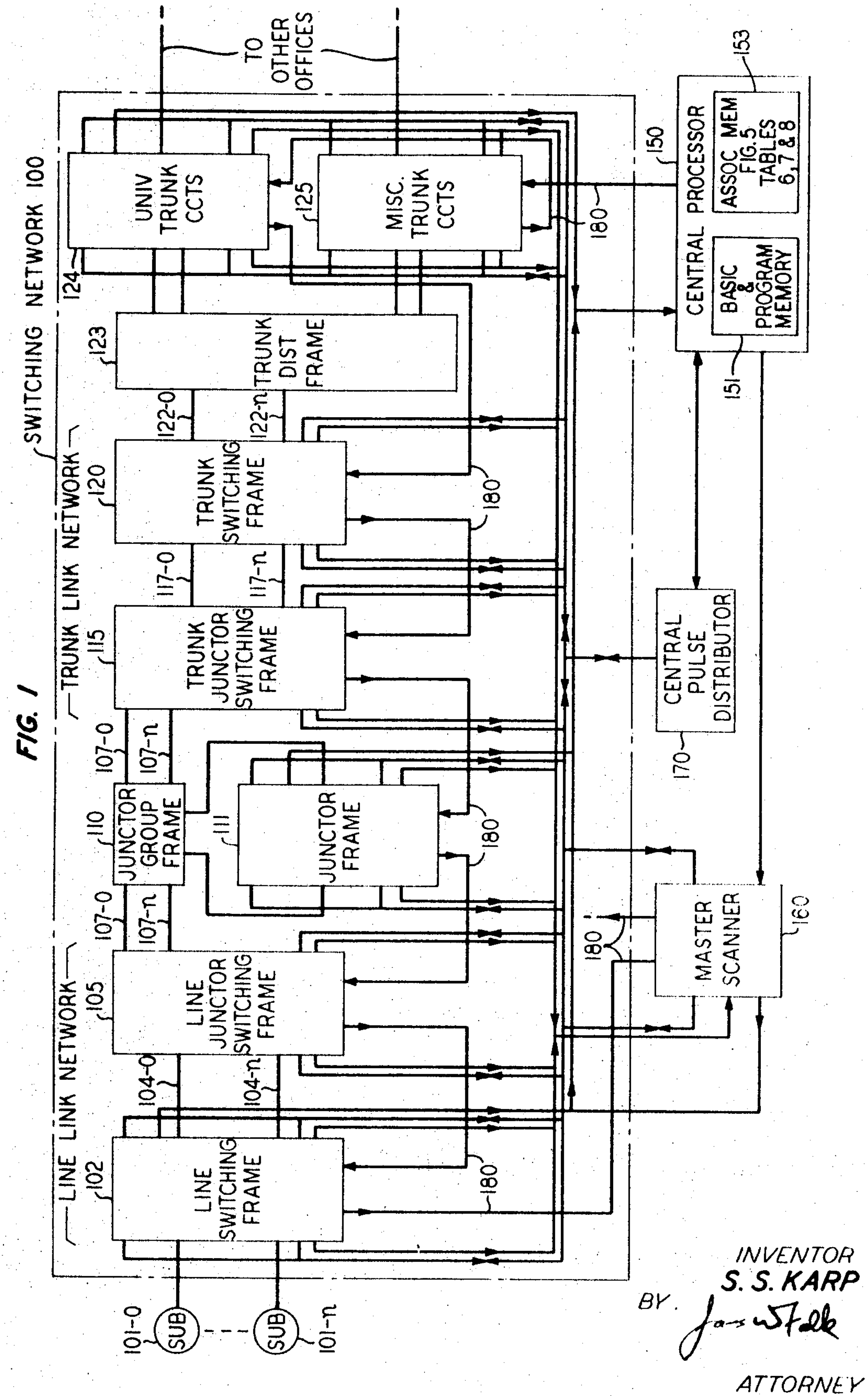
FIG. 1 is a block diagram of a multistage switching network and its basic control facilities including an associative memory in accordance with the invention.
Figure 5:
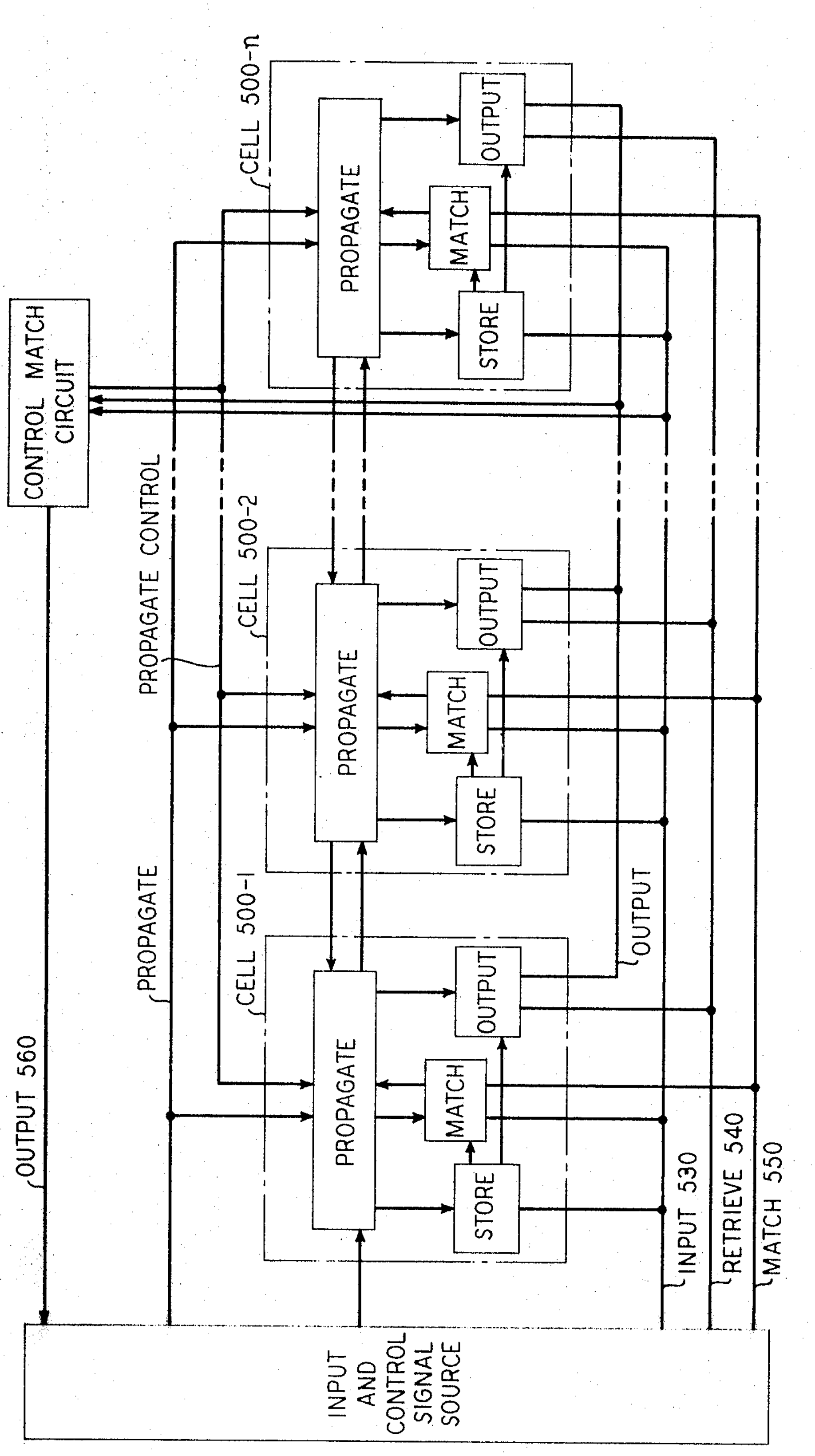
Figure 6:
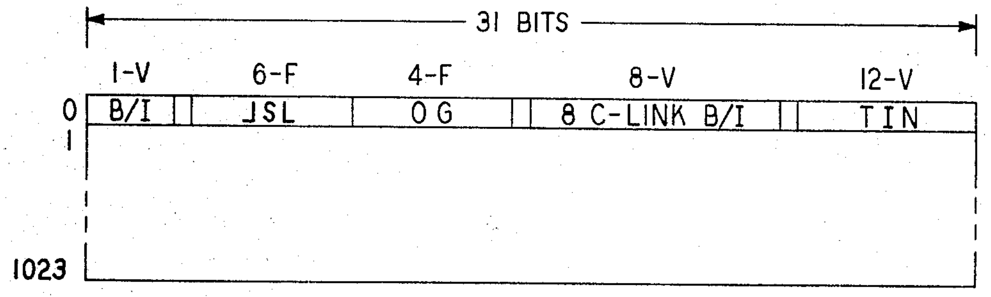
Figure 8:
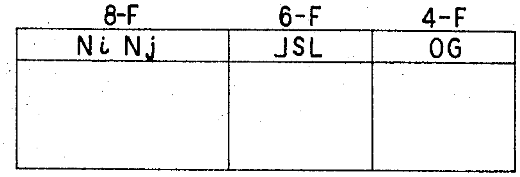
Figure 7:
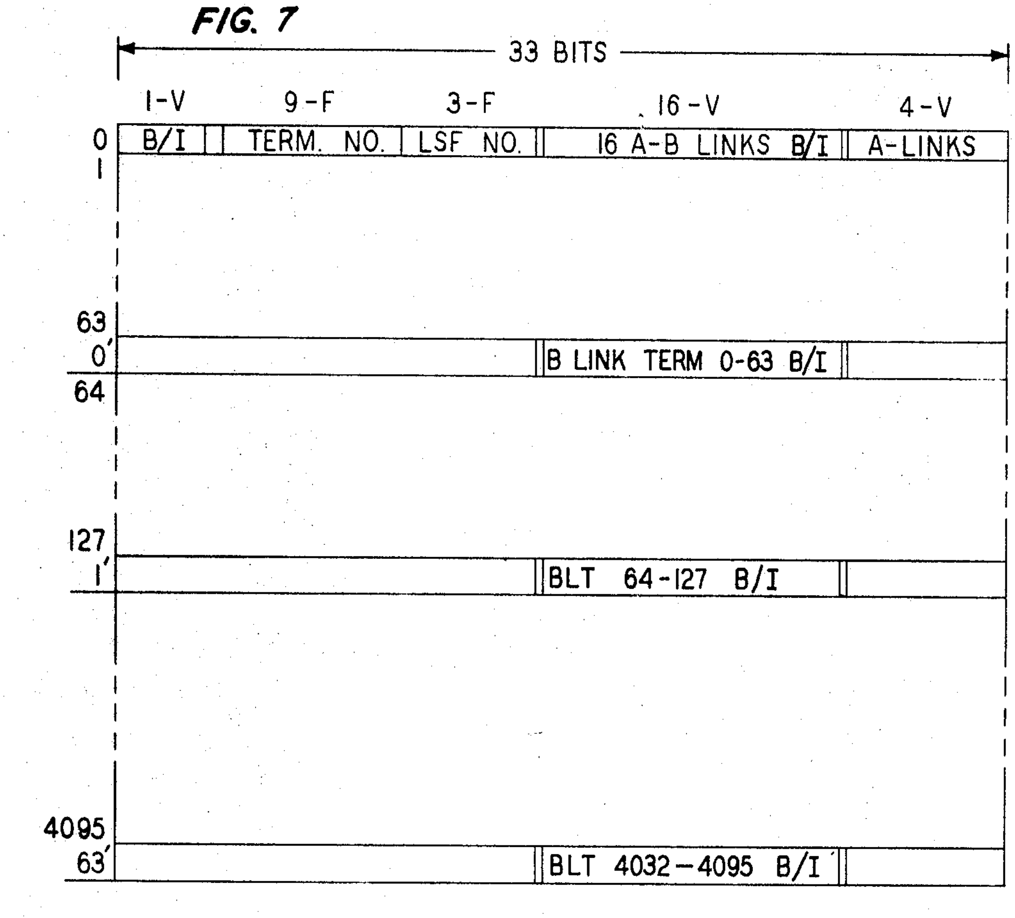

FIGS, 3 and 4 depict portions of the switching network of FIG. 1 in greater detail;

FIG. 5 is a block diagram of an associative memory which may be employed in the control of the network of FIG. 1 in accordance with my invention; and FIGS. 6, 7 and 8 are network map tables provided in the associative memory of FIG. 1 in accordance with the invention.

DETAILED DESCRIPTION

Turning now to FIG. 1, a communication system is depicted which provides one illustrative embodiment of this invention. This system includes a multistage switching network as described, for example in A. Feiner U.S. Pat. No. 3,257,513 issued June 21, 1966. An appreciation of this network arrangement is important only to the extent of understanding the path hunting requirements met by this invention. Thus the switching and control components may take any of a number of forms well known in the art.

The network comprises eight stages of switching joined by links. Topologically the network consists of four-stage groupings of two distant types; viz, line link networks and trunk link networks. Connecting these subnetworks among one another are junctor groups provided in a pattern consistent with the size and traffic requirements of a given central office.

Subscriber stations 101–0 through **101–*n* connect to the line link network which is divided into two stages contained in line switching frame 102 and line junctor switching frame 105 joined by intermediate or B-links 104–0 through 104–*n*. A typical line switching frame 102 has a concentration ratio of 4:1 and provides terminations for 4,096 stations. The line junctor switching frame 105 accommodates 1,024 junctor terminals 107–0 through 107–*n***.

Trunks and service circuits 124, 125 connect to the trunk link networks via trunk distribution frame 123. Each trunk link network is designed to terminate 1,024 trunks 122–0 through **122–*n* and also accommodates 1,024 junctor terminals. It comprises trunk junctor switching frame 115 and trunk switching frame 120 joined by B-links 117–0 through 117–*n***.

Figure 2:
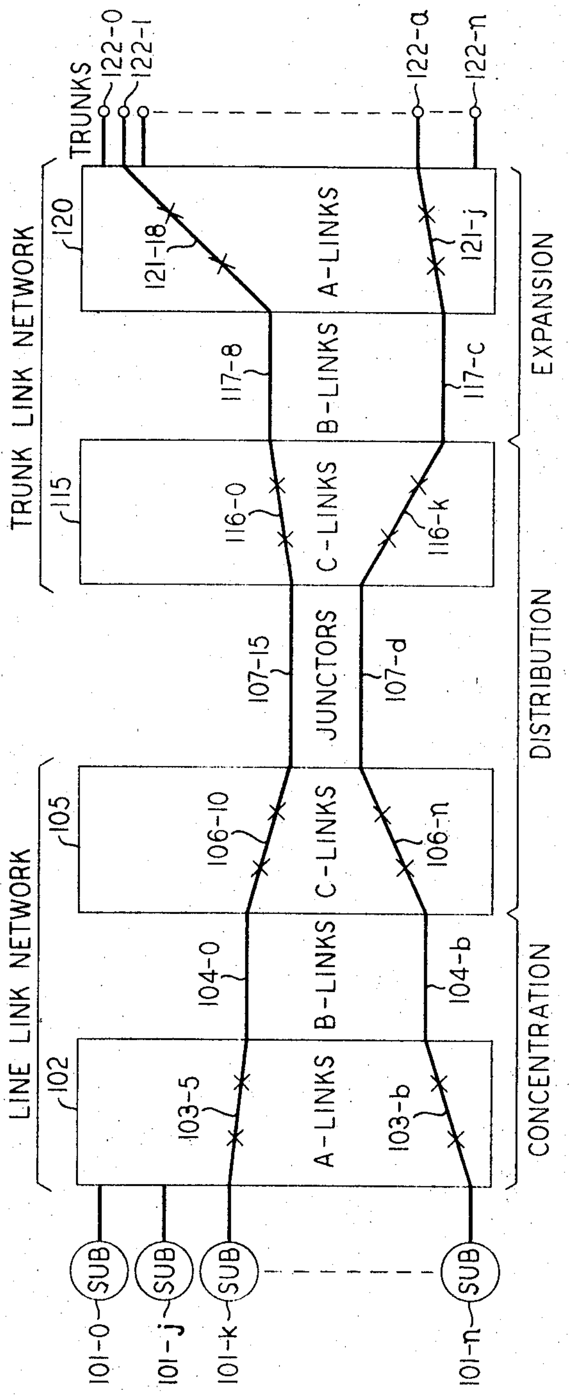
FIG. 2 depicts typical line interconnection paths through the multistage switching network of FIG. 1.

FIG. 2 depicts two typical station-to-trunk connections through the network. Thus, for example, station **101–*k* is connected through frames 102 and 105 to junctor 107–15 via concentration or A-link 103–5, B-link 104–0 and distribution or C-link 106–10. Similarly, trunk 122–1 is connected through frames 120 and 115 to the same junctor 107–15 via A-link 121–18, B-link 117–8 and C-link 116–0. Frame 102 concentrates the 4,096 station terminals of the illustrated subnetwork to 1,024 B-links; frame 105 distributes the concentrated connections through the 1,024 junctors to the other system subnetworks; and frame 120** expands the junctor connections destined for the illustrated trunk subnetwork through the A-links to the 1,024 trunks.

Certain of the junctors 107 of FIG. 2 are "loop-back" junctors. These allow a calling station, such as **101–*o***, *to be connected to a called station, such as 101–j*, when both stations are connected to the same subnetwork, namely, the line link network. Similar loop-back junctors exist for the trunk link network.

Figure 3:
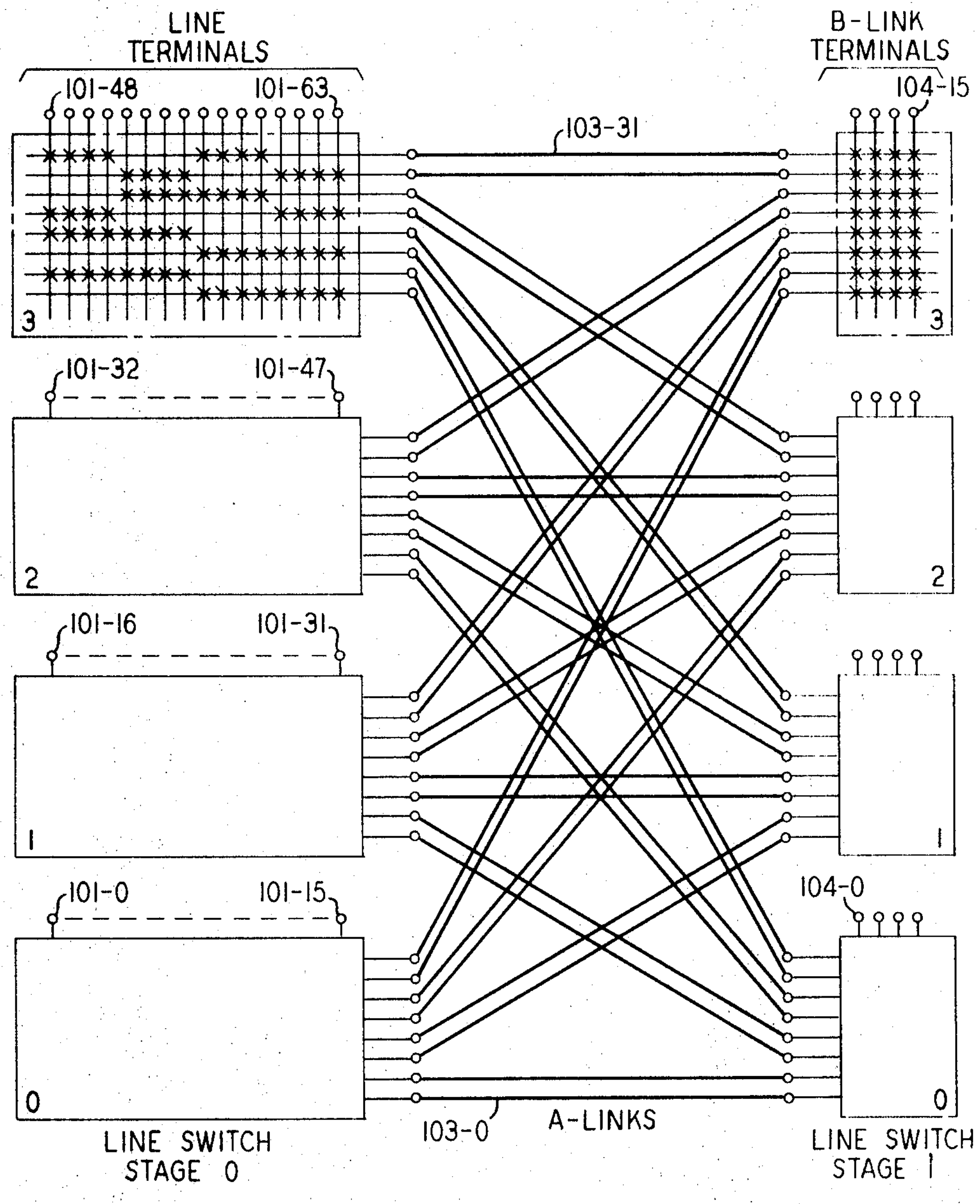

The first two stages of the line link network contain the concentration portion of the network and thus are termed the concentrator. FIG. 3 depicts a typical concentrator arrangement termed a concentrator grid. In this instance 64 line terminals 101–0 through 101–63 are concentrated to 16 B-links 104–0 through 104–15 via 32 A-links 103–0 through 103–31.

Figure 4:
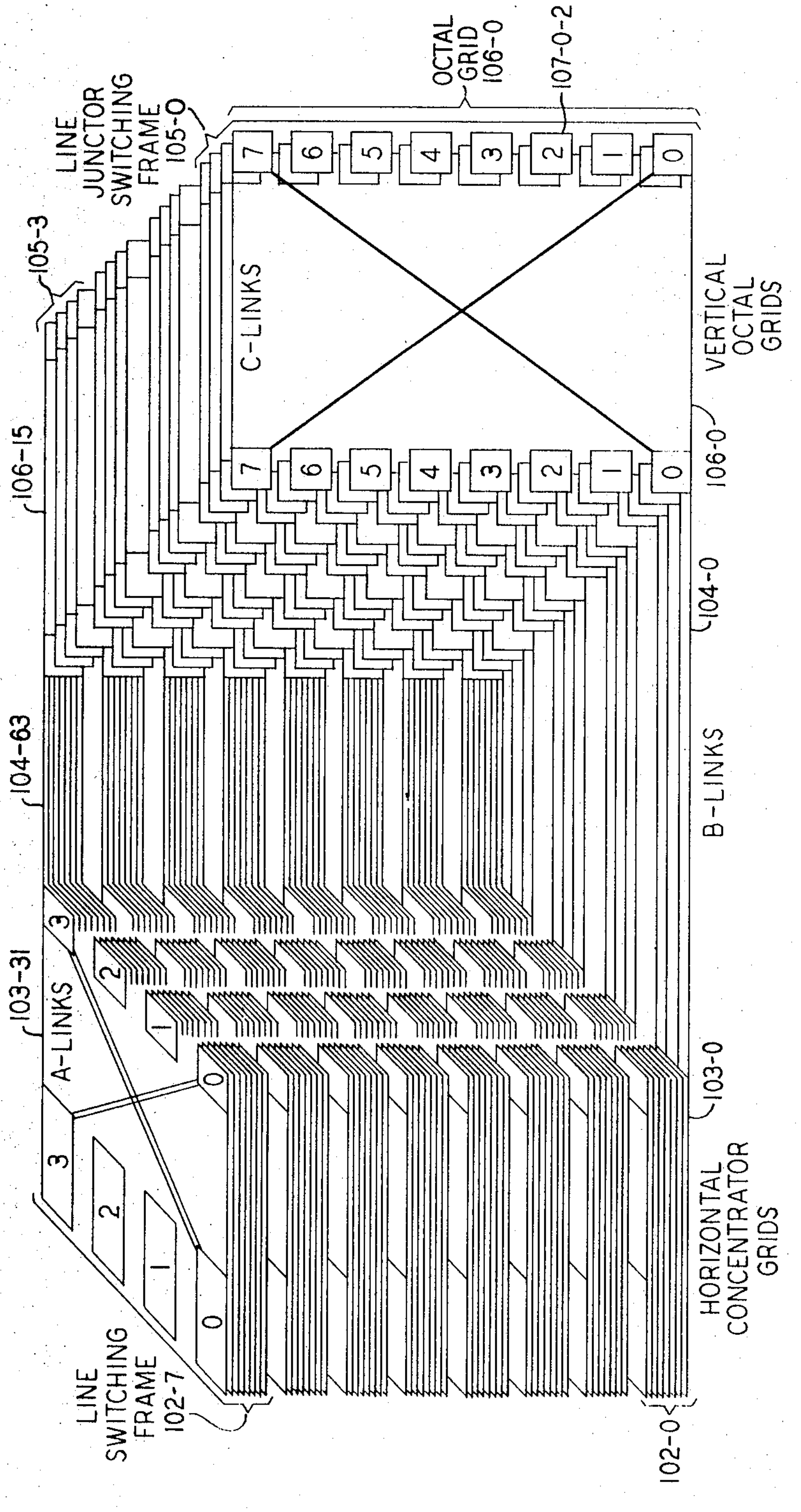

Turning now to FIG. 4 which shows a line link network, each line switching frame 102–0 through 102–7 comprises eight concentrator grids, depicted horizontally with each grid as shown in FIG. 3. The eight line switching frames 102–0 through 102–7 thus serve the 4,096 stations of the subnetwork and 1,024 B-links. As also seen in FIG. 4 four line junctor switching frames 105–0 to 105–3 are provided, each comprising the third and fourth network stages. Each line junctor switching frame includes four octal grids, such as 106–0 through 106–3. Each octal grid includes eight input or third stage switches and eight output or fourth stage switches, interconnected by the C-links. There are thus 16 octal grids, each of which includes 16 eight-by-eight switches, such as 107–0–2, thereby providing access for each of the 1,024 B-links to 1,024 of the junctors. Also each concentrator grid has 16 B-links, there being one B-link connected to each of the 16 octal grids, thus providing access for each station to the 1,024 junctors. The junctors, in turn, are divided into 64 subgroups with each subgroup containing 16 junctors, each junctor coming from a different octal grid on the same horizontal level. Thus any pair of subnetworks are interconnected by at least 16 junctors, since at least one junctor subgroup connects every pair of subnetworks.

FIG. 1 also illustrates, in block diagram form, the manner in which supervision and control of the multistage switching network may be accomplished, as further described in detail in K. S. Dunlap et al. U.S. Pat. No. 3,281,539 issued Oct. 25, 1966. Briefly, the switching network is commanded by a central processor which processes information obtained from various system components in accordance with control program sequences and system status information stored in memory 151. Central processor 150 then generates commands to initiate appropriate system operations in accordance with the results of such processing. These commands are transmitted for execution via command bus 180 to the various system components including line switching frame 102, line junctor switching frame 105, junctor frame 111, trunk junctor switching frame 115, trunk switching frame 120, master scanner 160, and central pulse distributor 170.

The basic function of an interconnection or switching network is to provide temporary connections between pairs of terminals of the network. Thus any terminal must be connectable to any other terminal of the network. In order to accommodate the many terminals of a larger interconnection network, the additional stages of switches depicted in FIG. 1 are employed. A complete path through the illustrated network, FIG. 2, involves eight switches and seven links. Since each complete distribution path, viz, C-link, junctor, C-link, has an access of eight, i.e., each input level on an individual switch, such as 107–0–2, of an octal grid can be connected to any one of eight output levels, and each concentration or expansion switch has an access of four, there may exist 4×4×8×8 or 1,024 possible junctor links that are accessible from every input terminal. Faced with this breadth of choice, an efficient path hunting algorithm clearly is essential for large networks.

In order to make the switching elements of a network as simple, reliable and inexpensive as possible, the network is required to perform only the switching function. It would be undesirable to require that the network also be able to report on the busy/idle condition of its cross-points. Therefore, this latter function is isolated from the network itself and performed by a read/write memory. For this purpose, in the prior art, a network map is maintained in the central processor 150, FIG. 1, in which the busy/idle status of each link of the physical network is recorded. In accordance with an aspect of my invention, this network map is maintained in the associative memory 153.

Prior networks which have this property of a memory map isolated from the physical network, as described, for example, in the aforementioned Dunlap et al. patent, have used coordinate addressed, ferritic memories for the functions of path hunting, connection control, and disconnect control. In order to understand how much more rapidly and efficiently these functions are accomplished with an associative memory in accordance with this invention, it will be instructive first to examine in some depth the way in which these functions are performed in the Dunlap et al. arrangement using a coordinate addressed memory. Reference to FIGS. 1–4 will assist in this regard.

Since it is desirable in any event to minimize the size of the memory required for the network map, a link map organization is utilized by Dunlap et al. having 1 bit in the map for each link of the network. Thus the busy/idle status of a link may be determined by examining its associated busy/idle bit; e.g., a "1" indicates an idle link, and a "0" represents a busy link. Since the concentration stages of the network present the highest blocking probability for a connection, these links have been searched first when hunting for an idle path.

The memory table for the first stage of concentration is laid out according to the terminal's position and identification number and according to the output level of each first stage switch. Indexing down this table by the most significant bits of the terminal's identification number (in binary notation) yields a pair of 16-bit words containing the busy/idle status of all 32 of the first stage A-links serving the terminals on the same concentrator grid, FIG. 3. By using the least significant bits of the terminal's identification number, i.e., the switch and input level identification, the particular links within this grid which are connectable to this terminal are obtained. A similar indexing with only the most significant bits of the terminal's identification number yields all the second stage B-link bits for the concentrator grid. Since every terminal on a concentrator grid has access to all 16 of its B-links, indexing now is terminated.

Since each of the four A-links retrieved has access to four of the 16 B-links retrieved, FIG. 3, each A-link bit must be expanded by a factor of four to form the logical AND for each of these 16 pairs of bits. If all the resulting A–B product bits are zero, the procedure is terminated since the terminal's access to the remainder of the network is blocked. If there exists at least a single one in the set of the A–B product bits, the terminal does have access through the concentration stages, and the search for a path through the network is continued. This same process is also performed for the terminal on the output subnetwork.

The entire network may be considered to be partitioned into several smaller subnetworks, N, according to each distinct group of terminals. The input terminal is one of 4,096 terminals on one subnetwork, $N_i$, and the output terminal is, generally, on a different subnetwork, $N_j$. Thus it is now necessary to determine which of the 1,024 junctors of the input $N_i$ connect to the junctors of the output $N_j$, since there may be several subnetworks within the overall network, and a junctor is the only tie between them. For every input $N_i$, then, there must exist a list in the memory of the junctors which connect to every other output $N_j$. The minimum number of junctors from any input $N_i$ to any output $N_j$ is 16, in the prior art, one for each output grid of each subnetwork.

The sets of junctors or junctor subgroups which connect $N_i$ to $N_j$ are kept in a circular linked list. When a request to connect $N_i$ to $N_j$ is made, the subgroup which was used the longest time ago is retrieved out of the circular linked list. This technique minimizes the blocking possibility, since idle links are most likely to be found in this group of junctors and the links connectable to it.

The next step of this prior path hunting procedure is then to find the appropriate junctor subgroup. This is done by indexing down a list of pointers for each $N_i$ according to $N_j$. The resultant word is the identity of the subgroup which was used longest ago between these two subnetworks. The list of the 64 subgroups for the $N_i$ can now be indexed by the identified subgroup to retrieve a word identifying a group of 16 busy/idle bits representing this junctor subgroup.

The final retrieval of busy/idle bits must now be done for the distribution or C-links, for both $N_i$ and $N_j$. The status of the 16 A–B links for terminal *i* and for terminal *j* already is available. Given a particular B-link and a particular junctor link, there exists a unique path between them, the C-link. Since the C-links exist between the third and fourth stages of switching, the cartesian cross product of the set of third stage switches by the set of fourth stage switches provides a one-to-one mapping onto the set of C-links. The third stage switch identification is determined by the group of eight concentrators to which the terminal is connected, i.e., by the line switch frame number. The fourth stage switch identification is determined by the output level that corresponds to the subgroup selected. Thus, to find the busy/idle status of the 16 C-links that connect the 16 B-links to the 16 junctor links of the subgroup, it is necessary to index down on the table of C-links for the $N_i$ and $N_j$ by this cross product of the third and fourth switch numbers. The result of this indexing is the 16-bit C word representing these C-link statuses.

It is now possible to determine the existence of an idle path between the input and output terminals via these 16 commonly accessible junctors. For $N_i$, the A–B word is ANDed with the C word and this A–B–C word is ANDed with the junctor J word. The same operation is also performed for the $N_j$ links, and the two A–B–C–J words are ANDed. This word represents the overall busy/idle status for the entire path for each of the 16 possible paths in this subgroup. If the bits are all zero, no path exists for this subgroup and the next subgroup in the circular linked list must be tried (with different C links). The process is continued until all possible subgroups accessible to both $N_i$ and $N_j$ are exhausted.

It is apparent therefore that the approach utilizing a conventional coordinate access address memory is prolonged and inefficient. Furthermore, when the time comes for this connection to be released, the link memory map does not contain sufficient information to determine what links to idle. This is because the link map contains only a collection of busy/idle statuses for every link in the network; i.e., there is no identification of which terminal is using each link. Therefore, there is no way of knowing which links are connected together, only whether a link is busy or idle. Conceivably this problem could have been surmounted by including the terminal identification number for each link in addition to its busy/idle bit. This approach, however, is extremely wasteful of memory, and unnecessarily redundant.

Since only one path can exist between a particular junctor link and a particular terminal, it has been sufficient to identify, for each junctor, the input or the output terminal that is using it. With this information, the path between a terminal and a junctor is "unraveled" by the previously described indexing process in reverse. The busy/idle bits of the link memory can then be made idle, and the connection abandoned. Thus, in the prior art, a path memory is required in addition to the link memory. For every subnetwork, $N_i$, there must exist a list of path memory words, one for each junctor of the network, in which is written the identity of terminals using that junctor. Although this approach is efficient in its use of memory, it is very time consuming because the path must be unraveled by this lengthy procedure when the connection is to be released.

In accordance with my invention, the problems inherent in this prior art approach are resolved by the use of associative memory and a unique path hunt algorithm.

A typical associative memory is described, for example, in C. Y. Lee U.S. Pat. No. 3,185,965 issued May 25, 1965. As noted therein an associative memory matches or associates the stored information with the data applied to all storage locations. Thus in order to retrieve a stored item, the data is applied to each storage location. If a match with stored information is obtained, the desired item stored in associated storage locations may be read out. FIG. 5 depicts one such associative memory utilized as the memory 153 (FIG. 1) of central processor 150 (FIG. 1) in the combination of my invention. As there shown, a series network of storage cells 500–1 through **500–*n* stores symbols, each comprising a portion of the identity or name for a stored message or a portion of the message itself. Each cell contains input, match, output, and propagate circuits. Signals are supplied to each match circuit over leads represented by match cable 550 and input cable 530, whereupon the content of each cell is matched against the applied symbols. When a match occurs in a particular cell, a signal is transmitted from its propagate circuit to one of the adjacent cells thereby conditioning its propagate circuit for a possible match with the next applied symbol. Output cable 560 is activated by signals on retrieve cable 540** upon completion of the matching operation to permit retrieval of information from those cells which were primed for retrieval during the matching operation.

The key to the employment of an associative memory in accordance with my invention is the provision of a method which permits it to operate on a competitive basis with other memory forms. Thus in accordance with my invention, two associative memory tables are provided in memory 153, FIG. 1, for each subnetwork N.

The first table, FIG. 6, stored in associative memory 153, is organized according to junctors, and in this example is 1,024 words in length. The numbers above each field of the word indicate the bit width of that field. "V" indicates variable information, and "F" indicates fixed information. The entire word is 31 bits wide. The B/I field indicates the variable, busy/idle status of the junctor associated with that word. The junctor identity, which is fixed, is given in the junctor switch-level number, JSL, field and the octal grid number, OG, field. Thus, these 10 bits identify one out of 1,024 junctors for the particular subnetwork N. The status of each of the eight C-links accessible to each junctor is kept in the following 8-bit variable field. If the junctor is idle, the variable terminal identification number, TIN, field is set to zeros. If the junctor is busy, however, the identity of the terminal which is using that junctor is recorded in this 12-bit variable field. Thus, part of each word in this table is link memory oriented and part is path memory oriented.

The other associative memory table, FIG. 7, stored in associative memory 153, is organized according to the terminals of each subnetwork N. There are 4,160 words per subnetwork, i.e., one word for each of the 4,096 terminals plus an additional 64 word (primed numbers) for the B-link statuses, one B-link status word for each concentrator grid of 64 terminals. Thus word 0' contains 16 bits indicating the status of the 16 B-links for terminals 0–63. The first variable field, the busy/idle bit for each terminal, has been mentioned earlier. With this bit, the status of the terminal can very quickly be determined, rather than having to check the busy/idle status by interrogating at this time an external and slow sensing device. Thus the busy testing function of the output terminal can now be made an integral part of the path hunting process. The next two fields are fixed and represent the 12-bit terminal identification number, TIN, partitioned into the line switch frame number, LSF, and the 9-bit identity of the terminal itself within the frame. The 4 A-link status bits for each terminal, a variable, are maintained in the last field. The 16 busy/idle bits for the B-links are maintained on a per concentrator basis in the primed words in order to avoid excessive redundancy. Thus each of the 16-bit primed words gives the status of the 16 B-links involved in the A–B link connections for the concentrator of the 64 words immediately above the primed word. There is some redundancy in the A-link status words, but it is very minor because of the small 4-bit width, and because the subgrouping of 64 terminals makes it relatively easy to update. The 4 A-link busy/idle bits are expanded to 16; i.e., the leftmost bit becomes the 4 leftmost bits, et cetera, and are then ANDed with the 16 B-link busy/idle bits for each 64 terminal concentrator grid to form the 16 A–B links field for each terminal. This ANDing operation is performed every time a terminal's A-link or a concentrator's B-link is changed.

Before detailing the particular method for employing the associative memory to determine idle paths through the network, in accordance with my invention, it should be pointed out that, as known in the art, an associative memory may store each bit of information in a cell and that each cell or group of cells has included in it a tag bit allowing access to a string of information in the cells. Further tag start and stop bits can be employed to represent different strings of information. Thus a tag bit with the busy/idle bit can be used to represent that bit alone or the whole word. The flexibility of associative memories allows different length strings to be retrieved. Further while the tables of FIGS. 6, 7, and 8 have represented, pictorially, each word in a line, in the actual implementation in an associative memory, the bits may be positioned in diverse locations in different cells provided that the operation of the memory is such that they can represent a string of information. It is to be recalled that there is a table, FIG. 6, and a table, FIG. 7, for each subnetwork.

With the above discussion in mind, my novel method of employing associative memory in the control of a switching network can now be set forth specifically. The method which is followed in establishing a connection through the network in accordance with this illustrative embodiment of the invention comprises the following steps:

1. The tag bit is applied to the busy/idle cell of the associate memory 153 utilizing the table of FIG. 7 for the appropriate output subnetwork to determine the busy/idle status of the output terminal to be utilized on the connection. In this example we shall assume that the call is to an outgoing trunk so that the output terminal is a terminal on a trunk switch frame 120 within a trunk link network. If the busy/idle bit is a "0" indicating that the trunk is busy, the attempt to establish this particular path is aborted. Of course, whole trunk groups may be examined at a time to determine the availability of any one trunk. However, we shall assume that the status bit for the desired trunk terminal is "1" indicating that the terminal and the trunk are idle.

2. The processor is now aware of the input terminal on one of the line switch frames 102 within a line link network and the idle output terminal on one of the trunk link networks. These two networks are the two subnetworks involved in this call. As noted above, the first four bits of each terminal number identify the subnetwork, whether an input subnetwork $N_i$ or an output subnetwork $N_j$. Accordingly, the corresponding subnetworks for this call are readily identified from the terminals.

3. With the subnetworks identified, we must determine which junctors interconnect these subnetworks. This may be done in a number of ways; in accordance with this embodiment of my invention the four bits identifying the input subnetwork ($N_i$) and the four bits identifying the output subnetwork ($N_j$) are utilized as an 8-bit word to access the associative memory 153, using the table of FIG. 8, to obtain all the junctor identities, which are stored as the junctor switch level JSL and the octal grid identity OG. Since the table of FIG. 8 is a fixed lookup table, a coordinate memory may be alternatively utilized instead of the associative memory.

4. Having now identified the input and output terminals, input and output subnetworks, and the interconnecting junctors that indicate paths that might be available if not busy, we can start excluding various paths because of the busy conditions present in the network. Thus the junctor identities, JSL–OG, enable us to enter the associative memory, using the table of FIG. 6, to determine the busy/idle states for the junctors, by ascertaining the busy/idle bit for that junctor. We must also determine which C-links are available and not busy. The line switch frame number LSF for the input terminal also specifies the third stage switch (0–7) in the line junctor switching frames 105, see FIG. 4, and thus specifies which of the eight C-links (0–7) are connected to a given idle junctor. Using that number (0–7), that particular bit in the C-link busy/idle list of table 6 is examined, thereby determining the condition of the associated C-link. Needless to say, this idle C-link is only of interest if that junctor connected to it is also idle.

5. From FIG. 4 it can be seen that for a given horizontal concentrator grid, 103–0, the 16 B-links map one-to-one onto the 16 octal grids of the line junctor switching frames. The given input terminal is on a specific concentrator grid (see FIG. 3) and has access to the 16 B-links of that concentrator grid via the A-links. It is now clear that the 16 A–B links B/I statuses correspond to the 16 octal grids. Accordingly, we can use determine identified octal grid numbers (0–15) OG, from FIG. 6, for idle junctors and look only at those individual bits in busy/idle words for the A–B links serving the input terminal as determined by the terminal identification number (TERM NO–LSF), in the table of FIG. 7, for the appropriate input subnetwork.

This process, in accordance with my invention, is a winnowing process wherein, after determining that the output terminal is idle, the method determines which junctors are idle, which C-links for those idle junctors are idle, and which A–B links for those idle C-links are idle. The number of possible junctors decreases as the additional C-link and A–B link tests are made. It is a characteristic of associative memories that this type of search need not be done sequentially but that, given an input condition, all of the outputs can be simultaneously obtained. Accordingly, a number of these operations may be occurring simultaneously.

In accordance with my method, therefore, a list of possible junctors is kept; this list may be retained in the table of FIG. 6 or in a separate table. As the other conditions are applied, junctor identities are removed from the list; for example, a junctor identity OG is removed if the A–B link bit is busy. At the end of this process, accordingly, there is available a list of junctors; the identity of an idle junctor OG and the identity of the line switch frame (LSF) determine the A–B and C-links, respectively, for that path.

The above description was directed to determining the A–B link and C-link to be employed in the input subnetwork $N_i$; the same operations must also be performed for the output subnetwork $N_j$. When this is completed there is a second list of available junctors which, together with the output terminal identification, identify the A–B and C-links available in the output subnetwork $N_j$, i.e., the trunk link network for this example. It is then a simple process for the processor to match these possible junctors and to determine the successful, idle path. The central processor then updates all the tables for the path selected to reflect the new busy/idle states and causes the physical connection to be completed.

It should be noted, of course, that in matching the two lists of possible junctors, as kept track of by the associative memory, any slip in the wiring, as is common in large networks, must be taken into account.

The method of releasing the connection is essentially the reverse of the above-described steps and is both simple and fast. It comprises 1. Search the input subnetwork junctor table, FIG. 6, for the presence of the input terminal identity TIN, if, for example, we want to release the input subnetwork first.

2. The busy/idle bit B/I for the junctor (JSL–OG having that input terminal TIN in its word is then idled (set to "1") and the TIN is erased (set to all "0's") in this word.

3. Using the octal grid number OG associated with that junctor JSL, as just determined in step 2, the appropriate bit position of the A–B links is idled in the table of FIG. 7 for the word associated with that terminal (TERM. NO.–LSF), the TIN from FIG. 6 being matched against the TERM. NO. and LSF of FIG. 7. The B-link status for the 64 word subtable, FIG. 7, is also idled in the identical bit position as for the A–B link just idled.

4. In FIG. 7 using that input terminal number, the busy/idle bit B/I is idled. The appropriate A-link bit is also idled using a four-to-one compression from the 16 A–B bits to the four A-link bits.

5. Using the line switch frame number LSF from FIG. 7, the appropriate C-link bit, FIG. 6, is idled in the word for this junctor (JSL–OG).

6. The steps 1 through 5 are repeated for the output subnetwork and output subnetwork tables.

7. When the tables have been updated, the physical connection in the network is released.

What is claimed is:

1. In a communication switching system having a multistage switching network and a central processor including an associative memory, said network including input and output subnetworks interconnected by junctors and switches interconnected by links, and said associative memory including first tables organized to indicate the condition of said junctors and certain of said links and second tables organized to indicate the condition of subnetwork terminals and other of said links, the method of establishing a path through said network comprising the steps of a. obtaining the identities of all possible junctors for the path between a particular input and a particular output subnetwork and storing a list of such identities;

b. from a first associative memory table determining the busy/idle states of these junctors in one subnetwork;

c. from the subnetwork terminal identification for one subnetwork determining the busy/idle state of links in said first table;

d. from the junctor identities determining the busy/idle state of links in the second table for said one subnetwork;

e. removing from the list of stored junctor identities those junctors for which links are busy;

f. performing steps (a) through (e) for the other subnetwork;

g. matching the two stored lists of idle junctors to determine a possible path through the network; and h. based on one of these matches establishing the path through the identified idle links and junctor.

2. In a communication system comprising a multistage switching network having a plurality of terminals, a plurality of subnetworks each serving a distinct group of said terminals, a plurality of junctor links for interconnecting said subnetworks, each of said subnetworks comprising concentration, intermediate and distribution links for interconnecting said terminals and said junctor links and a network control comprising an associative memory having first tables organized to indicate the condition of said junctor links and second tables organized to indicate the condition of said terminals, the method of determining a path through said network from an input one of said terminals to an output one of said terminals comprising the steps of associatively searching a first table to locate all of the idle distribution links serving said input terminal and each of the idle junctor links, associatively searching a second table to locate the idle combined concentration and intermediate links serving said input terminal, associatively searching the first and second tables to locate idle links serving said output terminal, selecting an idle path from said located idle concentration, intermediate, distribution and junctor links between said input and output terminals, marking the links in the selected path as busy in the first and second tables, and completing the connection via said selected path.

3. In a communication switching system having a multistage switching network including network terminals, links, and junctors, and control means including associative memory means having at least a first table identifying junctor busy/idle states and a second table identifying terminal busy/idle states, the method of establishing a path through the network comprising the steps of determining the junctors existing between a selected input and output subnetwork of the network, from the first table determining the busy/idle status of the junctors, from the second table determining the busy/idle status of the terminal, and associatively determining from each table by a search based on information from the other table the busy/idle status of various of the links available between the junctors and the terminal.

4. In a communication switching system, the method in accordance with claim 3 further comprising storing a list of the identity of the junctors determined to exist between a selected input and output terminal and reducing that list as various junctors are determined to be unusable because of the busy status of various of the links.

5. In a communication switching system, the method in accordance with claim 4 wherein the availability of junctors is determined independently for an input and an output subnetwork and further comprising the step of matching the input and output subnetwork junctor lists.